United States Patent [19]
Maurey et al.

[11] 3,815,432
[45] June 11, 1974

[54] ADJUSTABLE PULLEY
[75] Inventors: Joseph E. Maurey, Chicago; James D. Campbell, Lombard, both of Ill.
[73] Assignee: Maurey Manufacturing Corporation, Chicago, Ill.
[22] Filed: Oct. 4, 1972
[21] Appl. No.: 294,891

[52] U.S. Cl. .................. 74/230.17 B, 74/230.17 C
[51] Int. Cl. ............................................. F16l 55/52
[58] Field of Search ............ 74/230.17 A, 230.17 B, 74/230.17 C, 230.17 R; 287/52.05, 52.09, 52.08

[56] References Cited
UNITED STATES PATENTS
| 602,287 | 4/1898 | Green | 287/52.09 |
| 2,010,451 | 8/1935 | Browning | 287/52.05 |
| 2,779,202 | 1/1957 | Jackson | 287/52.05 |
| 3,661,023 | 5/1972 | Maurey | 74/230.17 B |
| 3,680,404 | 11/1970 | Firth | 74/230.17 C |

FOREIGN PATENTS OR APPLICATIONS
| 872,177 | 0/1941 | France | 74/230.17 C |

Primary Examiner—Manuel A. Antonakas
Assistant Examiner—R. H. Lazarus
Attorney, Agent, or Firm—McDougall, Hersh and Scott

[57] ABSTRACT

A pulley construction wherein a pair of flange members are mounted on a shaft, and wherein the hub of one flange member is received within the hub of the other flange member. The flange members are adjustably secured on the shaft whereby the size of the belt receiving groove between the flange members can be changed. The securing means comprise a wedge defining side edges, and channels are defined in the hub for receiving the wedge. A set screw is receivable within an opening defined by one hub and within an aligned opening defined by the wedge. The wedge is preferably split so that movement of the set screw within the wedge opening operates to drive the wedge sections into engagement with the adjacent channel faces thereby tying the hubs together. A separate opening may be provided in either hub for receiving a set screw which serves to tie the assembly of flange members against movement relative to the shaft.

14 Claims, 16 Drawing Figures

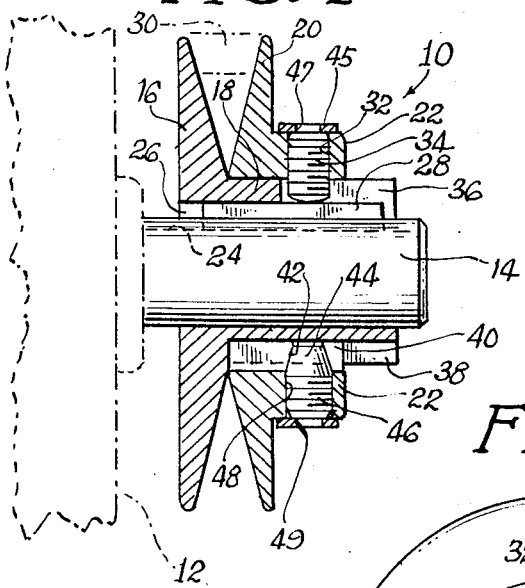
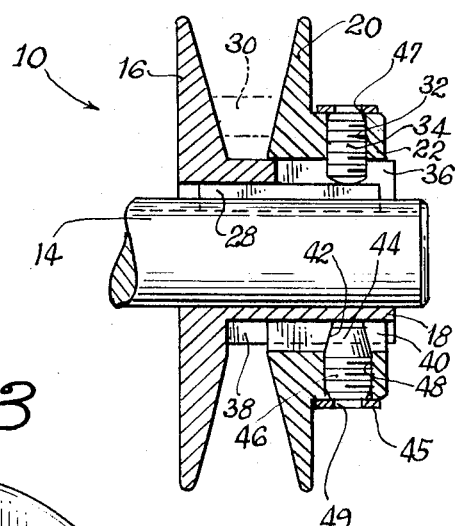
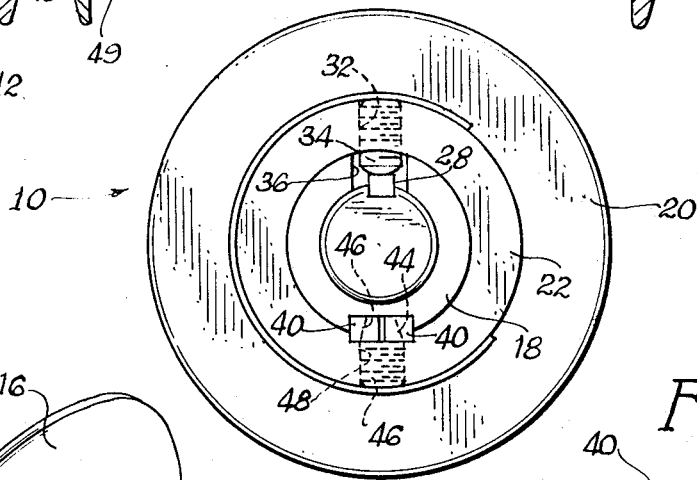
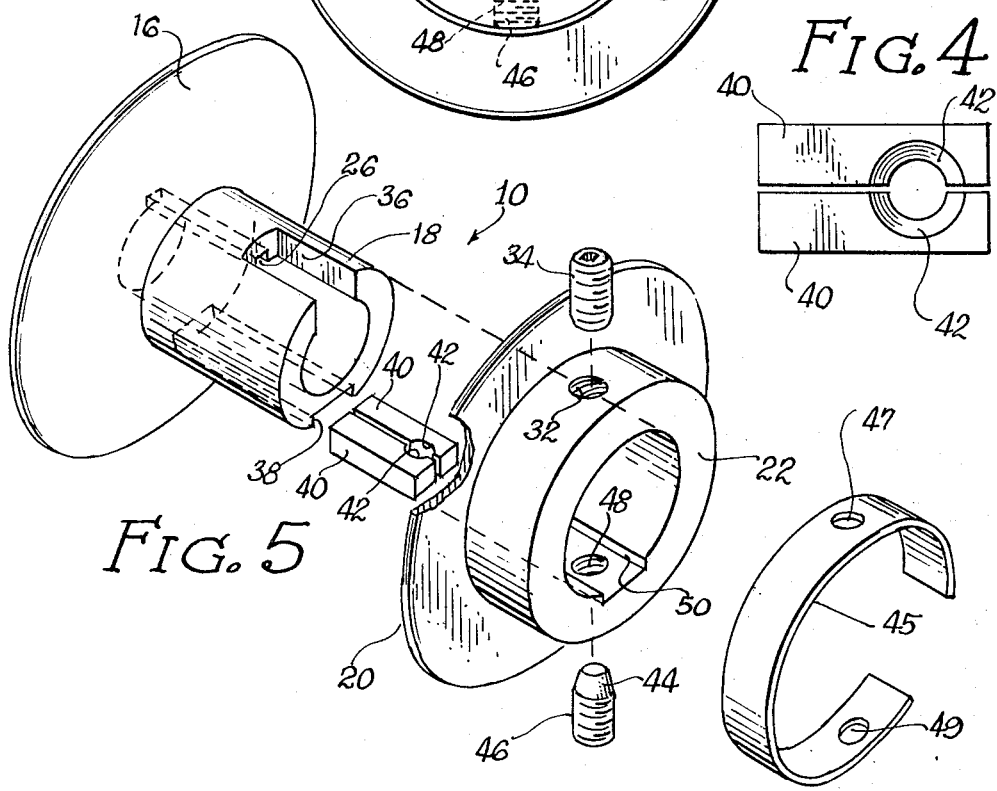

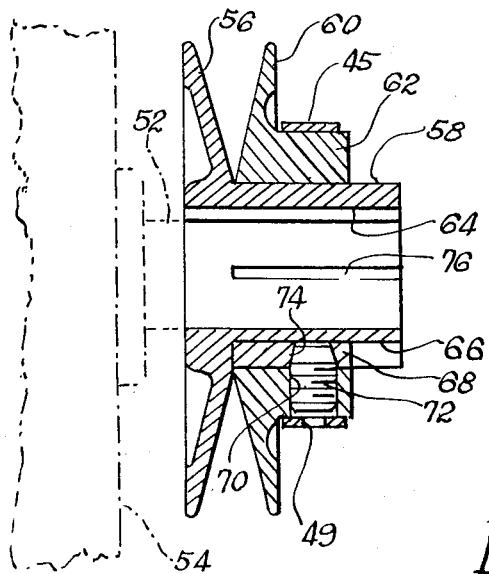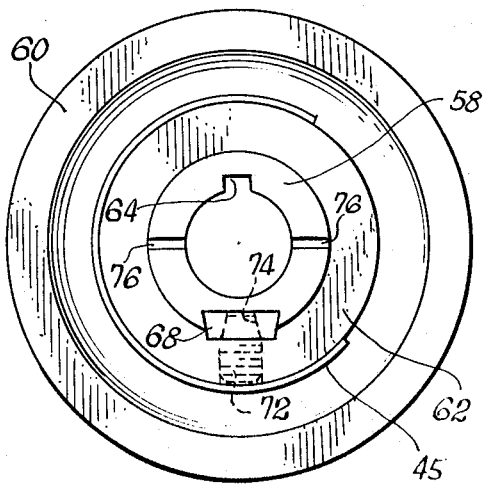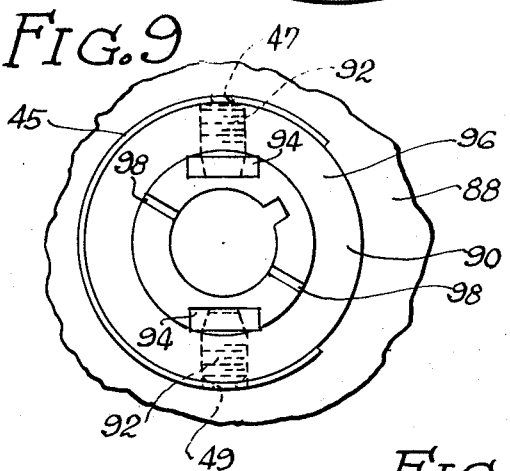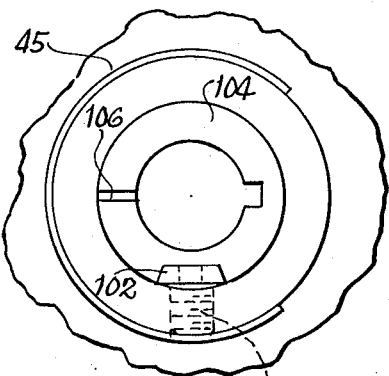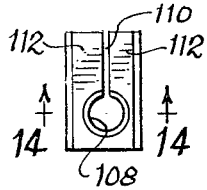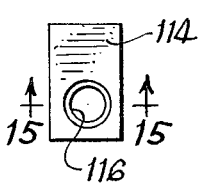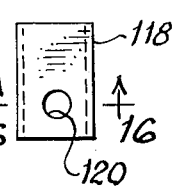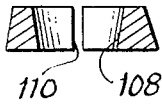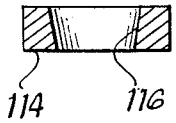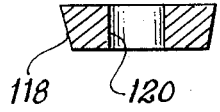

ADJUSTABLE PULLEY

This invention relates to a pulley construction, and it is particularly directed to a pulley construction having adjustable flange members whereby the belt receiving groove defined by the flange members can be changed to thereby vary the performance of the pulley. The pulleys of this invention are particularly suitable for use in conjunction with drive motors and shafts; however, the pulley design may be utilized for other applications.

Adjustable pulleys are useful for applications which require different motor performances under different circumstances. For example, in heating and ventilating applications, a motor of a particular horse power may be designated for use. The output shaft of the motor will ordinarily be utilized for driving a belt which in turn will drive blowers. The performance of the blowers will affect the operating characteristics of the heating and ventilating systems.

Pulleys used for supporting drive belts will determine the blower speeds since the relationship between the diameter of the drive shaft pulley and blower shaft pulley will control the blower shaft speed. In order to permit adjustment of the blower shaft speed to thereby adjust the heating and ventilating operation, adjustable pulleys have been proposed. These pulleys are provided with belt supporting flange members with the spacing between the flange members determining the pitch diameter of the pulley. Thus, if the spacing is increased, the pulley belt will move closer to the pulley axis and, therefore, the pulley will have a smaller effective diameter. By providing pulley constructions which are infinitely adjustable, the heating and ventilating system can be set for most efficient operation.

Although adjustable pulley constructions provide the most effective means for use with heating and ventilating systems, difficulties still characterize such pulleys. The structure thereof is often relatively complex leading to increased costs. Providing adjustable pulley constructions which are securely held on a shaft can also be a problem. Finally, pulley constructions which are adjustable without undue effort are not easily obtained.

It is a general object of this invention to provide an improved pulley construction utilizing means for adjusting the pulley whereby the effective diameter of the pulley can be readily changed.

It is a more specific object of this invention to provide a pulley construction of the type described which includes means for securely fastening the pulley to a shaft whereby the adjustable features can be obtained without sacrificing operating efficiency.

It is a still further object of this invention to provide a pulley construction which includes highly accessible and easily operable mechanisms for achieving adjustment of the pulley whereby the advantages of the pulley construction can be readily obtained.

These and other objects of this invention will appear hereinafter and for purposes of illustration, but not of limitation, specific embodiments of the invention are shown in the accompanying drawings in which:

FIG. 1 is a vertical cross-sectional view of the pulley construction associated with a motor shaft;

FIG. 2 is a vertical sectional view of the construction shown in a more open position;

FIG. 3 is an end elevation of the pulley construction;

FIG. 4 is an enlarged plan view illustrating preferred wedge means utilized in combination with the pulley;

FIG. 5 is an exploded perspective view of the pulley construction;

FIG. 6 is a vertical sectional view illustrating a modified form of the invention;

FIG. 4 is an end elevation of the pulley construction shown in FIG. 6;

FIG. 8 is a side elevation, partly cut away, of an alternative flange member and associated hub;

FIG. 9 is an end elevation illustrating a still further alternative flange member and associated hub;

FIG. 10 is an end elevation illustrating a still further alternative flange member and associated hub;

FIG. 11 is a plan view of an alternative wedge design utilized with the construction;

FIG. 12 is a plan view of an additional alternative wedge design utilized with the construction;

FIG. 13 is a plan view of a further alternative wedge design utilized with the construction;

FIG. 14 is a cross-sectional view taken about the line 14—14 of FIG. 11;

FIG. 15 is a cross-sectional view taken about the line 15—15 of FIG. 12; and,

FIG. 16 is a cross-sectional view taken about the line 16—16 of FIG. 13.

This invention generally relates to a pulley construction including a pair of flange members mounted on a shaft with one flange member having a hub received within the hub of the other other flange member. The opposing inner faces of the respective flange members define a belt receiving groove.

The improvement of the invention relates to means for securing the flange members whereby the flange members can be adjusted on the shaft. The securing means comprise a wedge defining side edges, and channels formed in the hubs dimensioned to receive the wedge. A set screw is received within a threaded opening defined by one hub, and an opening defined by the wedge is aligned with the hub opening. The set screw enters the aligned openings and drives the edges of the wedge against the opposed faces defining the side walls of the channels. By contacting the wedge with the side walls in this manner, the respective hubs are secured relative to each other.

The structure of the invention enables adjustment of the spacing between the flanges while the flanges are in place on the shaft, and the securing of the hub portions is completely adequate to prevent any change in this spacing during operation of the pulley. The wedge and hub design can be such that the securing of the flange members to the shaft is accomplished simultaneously with the securing of the flange members to each other. The structure of the invention may include, however, a separate set screw arrangement for independently securing the hub assembly to a shaft.

FIG. 1 illustrates a pulley construction 10 associated with a motor 12. The motor includes an outwardly extending shaft 14 comprising the drive shaft for the motor.

A first flange member 16 defining a hub 18 is supported on the shaft. A second flange 20 is provided with a hub 22, and this hub is dimensioned so that it will slide easily relative to the hub 18 unless secured thereto. The shaft 14 defines a keyway 24, and a keyway 26 is defined by the flange members 16. A key 28 is received within the keyway 26 and within the keyway 24. The flange member 16 is adapted to be moved axially relative to the shaft 14; however, the key 28 ties the shaft and flange member for rotation together.

As illustrated in FIG. 2, the flange members 16 and 20 are adapted to be spread apart. Thus, it will be noted that the belt 30 shown in FIG. 1 is positioned adjacent the outer peripheries of the flange members when these flange members are as close together as possible. When the flange members are spread to the position shown in FIG. 2, the belt 30 moves inwardly whereby the effective diameter of the pulley is substantially decreased.

The hub 22 of flange member 20 defines a threaded opening 32 adapted to receive set screw 34. As best shown in FIGS. 1 and 2, the end of the set screw 34 is adapted to be driven against the key 28 for tying the assembly of flange onto the shaft 14. It will be noted that the key 28 extends for a substantial distance beyond the keyway 26 thereby providing a means for locking the set screw in position at any one of several locations along the length of the key. In order to accommodate the set screw 34, the hub 18 defines a cut-out section 36. This cut-out section permits entry of the set screw into engagement with the shaft while also permitting movement of the flange member 20 back and forth between open and closed positions. The use of set screw 34 and key 28 for tying the flange members 16 and 20 permits infinite variations in the size of the belt receiving opening.

The flange 18 of the flange member 16 also defines a channel 38 which is adapted to receive wedge blocks 40. The wedge blocks each define semi-cylindrical openings 42 which together provide a bore for receiving the tapered end 44 of set screw 46. A threaded opening 48 is defined by the hub 22 of flange member 20 for receiving the set screw 46 whereby the end 44 will enter the opening defined between the wedge blocks.

A second channel 50 is defined in the hub 22, this channel also being dimensioned to receive the wedge blocks 40. The opposed side walls of the channels 38 and 50 are adapted to be engaged by the edges of the blocks 40 when the screw 46 is driven into the openings 48 and 42. This provides substantial surface engagement which rigidly locks the respective hubs in a unitary assembly. The hubs will remain locked in this condition unless the set screw 46 is backed-off as would be the case where adjustment of the belt receiving groove is desired.

As shown in FIG. 4, the semi-cylindrical openings 42 of the wedge blocks are tapered to accomplish the desired wedging action. Thus, with tapered openings as illustrated, substantial force is developed which is transmitted to the side walls of the channels for achieving the locking action described.

In addition to the transverse component of force which is developed when the set screw 46 moves between the wedge blocks, a vertical force component is also developed. It has been found that this component can be used to supplement the securing function of the set screw 34, and in fact, the set screw 34 can be dispensed with particularly when used with slots as shown at 76 in FIGS. 6 and 7. Thus, the set screw 46 can be utilized to achieve locking the flange members 46 into a unitary assembly while also serving to tie the assembly against axial movement along the shaft 14.

The illustrated structure may incorporate a band 45 defining openings 47 and 49. This band may be of spring metal or plastic so that it can be snapped in place as illustrated. The opening 49 is aligned with the screw 46 so that a wrench can be inserted for rotating the set screw; however, the band will minimize the possibility of the set screw being backed completely out of the threaded opening 48 in which case the set screw could be lost. This arrangement is of particular advantage where the structure is being handled by relatively inexperienced personnel. As illustrated in FIG. 5, the opening 47 may be located for use in conjunction with set screw 34.

FIGS. 6 and 7 illustrate a modified version of the invention wherein an adjustable pulley is mounted on the shaft 52 of motor 54. This pulley comprises a first flange member 56 carrying a hub 58 and a second flange member 60 carrying a hub 62.

The hub 58 defines keyway 64 and a corresponding keyway is defined by shaft 52 whereby a key is employed for rotating the pulley along with the shaft. Appropriate channels, including channels 66, are defined by the hubs for receiving wedge 68. The threaded bore 70 defined by hub 62 receives set screw 72 whereby the movement of the set screw into the wedge opening 74 will serve to lock the flange members together.

The hub 58 is split by means of slots 76, and the action of the set screw 72 serves to tighten this hub around shaft 52. Thus, the splitting of hub 58 increases the force applying capability of the set screw 72 to the extent that a highly secure tightening of the pulley assembly onto the shaft 52 can be achieved. Thus, the tightening of the hub 58 around the shaft holds the pulley against axial movement along the shaft.

FIG. 8 illustrates a modified form for the flange member defining the inner hub. Specifically, this flange member 78 defines a first hub portion 80 having a keyway 82 for association with a motor shaft in the manner described. A second hub portion 84 is defined by the flange member, and a threaded opening 86 is provided for a set screw. This threaded opening is adapted to be driven into engagement with a key located in the keyway 82 to tie the flange against axial movement along a shaft. The wedge arrangement previously described can then be employed for locking the flange members in the desired relationship.

FIG. 9 illustrates an additional alternative wherein flange member 88 is provided with hub 90. This hub defines threaded openings for receiving a pair of set screws 92 with each set screw being engageable with a wedge 94. This arrangement provides additional security in terms of locking the hub 90 of flange member 88 to the inner hub 96 of the other flange member. A pair of slots 98 are provided for achieving locking of the hub 96 onto a shaft in response to the action of the set screws and wedges 92 and 94.

In the modification shown in FIG. 10, a single set screw 100 is associated with a single wedge 102. In this instance, the inner hub 104 defines a single slot 106, and it has been found that this arrangement is sufficient for purposes of securing the assembly of flange members onto a shaft.

FIGS. 11 through 16 illustrate alternative embodiments of wedges. The first wedge comprises a one-piece structure defining opening 108 for receiving the end of a set screw. The slot 110 permits spreading of the wing portions 112 of this wedge to achieve the desired locking function.

The arrangement shown in FIGS. 12 and 15 comprises a unitary wedge 114 with the bore 116 thereof being tapered. Thus, this wedge eliminates the partial or complete separation; however, the application of lateral and vertical pressure can still be accomplished with this structure.

The wedge 118 shown in FIGS. 13 and 16 includes a straight-through bore 120; however, the side faces of the wedge are tapered. Again, this provides for transmission of the desired forces to achieve the desired results.

It will be understood that various changes and modifications may be made in the above described construction which provide the characteristics of the invention without departing from the spirit thereof, particularly as defined in the following claims.

What is claimed is:

1. In a pulley construction wherein a pair of flange members are mounted on a shaft, each member including a hub with the hub of one member being received within the hub of the other member and being adapted for axial sliding movement relative to the other hub member, and wherein the opposing faces of said members define a belt receiving groove whereby the size of the groove is changed upon movement of the hubs relative to each other, the improvement in means for securing said flange members together on the shaft comprising a wedge defining opposed parallel surfaces and side edges extending between said surfaces, a first channel formed in a first one of said hubs, said channel defining a base and opposed side faces, the channel being dimensioned so that the base and side faces are engaged, respectively, by one surface of said wedge and by the side edges of said wedge, a second channel formed in the second one of said hubs and aligned with said first channel, said second channel defining a base and opposed side faces and the second channel being dimensioned so that its base and side faces are engaged, respectively, with the other surface of said wedge and with the side edges of said wedge, a set screw, a third opening defined by the second hub receiving said set screw, an opening defined by said wedge aligned with said threaded opening, said wedge being split and said wedge opening being located at the split whereby said set screw is adapted to enter said aligned openings for engagement with the wedge to apply force to the split portions of the wedge whereby the wedge surfaces and side edges are forceably engaged with the respective bases and side faces of said first and second channels for thereby holding said flange members against movement relative to each other.

2. A construction in accordance with claim 1 wherein said wedge is formed in two pieces.

3. A construction in accordance with claim 1 wherein said wedge comprises a single piece defining a slot extending partly along the length of the wedge, said slot terminating in said wedge opening.

4. A construction in accordance with claim 1 wherein said edges of said wedge are inclined, and wherein a corresponding incline is defined by said opposed faces.

5. A construction in accordance with claim 1 wherein said wedge opening is tapered.

6. A construction in accordance with claim 1 wherein said wedge opening is threaded.

7. A construction in accordance with claim 1 wherein one of said hubs defines a second threaded opening, a second set screw received in said opening, said second set screw engaging said shaft for holding the assembly of said members in position on said shaft.

8. A construction in accordance with claim 7 including a key-way defined by said shaft and an aligned key-way defined by the hub surrounding said shaft, a key received in the aligned key-ways, said second set screw engaging said key for providing said holding function.

9. A construction in accordance with claim 8 wherein said second threaded opening is defined in said second hub, a slot defined by the first hub, said second set screw extending through said slot into contact with said key.

10. A construction in accordance with claim 8 wherein said second threaded opening is defined in said first hub, said first hub including a first portion extending on one side of said member, and a second portion extending on the opposite side of said member, said first channel being formed in said first portion and said second threaded opening being formed in said second portion.

11. A construction in accordance with claim 1 wherein said first hub is split whereby tightening of said set screws operates to press said first hub into engagement with said shaft.

12. A construction in accordance with claim 11 wherein said first hub defines a pair of grooves each receiving one of said wedges.

13. A construction in accordance with claim 11 wherein said first hub is split along a pair of longitudinally extending lines positioned on opposite sides of said shaft.

14. A construction in accordance with claim 1 including a retaining band extending around said second hub, an opening defined by said band aligned with the opening in said second hub, said band opening being smaller than the diameter of said set screw but sufficiently large to permit the entry of a tool for operating said set screw.

* * * * *